(12) United States Patent
Holmes et al.

(10) Patent No.: US 7,438,493 B2
(45) Date of Patent: Oct. 21, 2008

(54) CROSS AXIS BALL AND SOCKET JOINT WITH SEALING RING FOR CROSS AXIS SLEEVE ENDS

(75) Inventors: Eric Holmes, Ann Arbor, MI (US); Frank Fehre, Bad Essen (DE); Markus Fischer, Northville, MI (US)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 80 days.

(21) Appl. No.: 11/266,869

(22) Filed: Nov. 3, 2005

(65) Prior Publication Data
US 2007/0110510 A1    May 17, 2007

(51) Int. Cl.
*F16C 11/00* (2006.01)
(52) U.S. Cl. .............................. 403/134; 403/50; 403/51
(58) Field of Classification Search .................... 403/50, 403/51, 134; 464/173, 175; 74/18, 18.1, 74/18.2; 277/634–636; 384/140, 203, 206, 384/208
See application file for complete search history.

(56) References Cited

U.S. PATENT DOCUMENTS

| | | | | |
|---|---|---|---|---|
| 4,129,343 A | * | 12/1978 | Janssen | 384/215 |
| 4,447,094 A | * | 5/1984 | Trudeau et al. | 384/145 |
| 5,439,203 A | * | 8/1995 | Hadano | 384/203 |
| 6,349,470 B1 | * | 2/2002 | Sasaki et al. | 384/208 |
| 2004/0146338 A1 | | 7/2004 | Broker et al. | |

FOREIGN PATENT DOCUMENTS

| DE | 102 01 022 A1 | 7/2003 |
|---|---|---|
| DE | 103 62 009 A1 | 4/2005 |

* cited by examiner

*Primary Examiner*—Victor MacArthur
(74) *Attorney, Agent, or Firm*—McGlew & Tuttle, P.C.

(57) ABSTRACT

A ball joint, is provided in the form of a cross axis joint with a housing, a bearing shell in the housing and a ball sleeve. The ball sleeve includes a ball portion with a bearing surface cooperating with the bearing shell and a first pivot pin and a second pivot pin extending from said ball portion in an axial direction. The ball sleeve has an inner surface defining a through hole (50) for receipt of a connection bolt. The first pivot pin has a first end with a first outer surface (42) and a first annular end face (41) and the second pivot pin has a second end with a second outer surface (44) and a second annular end face (43). Sealing rings (60, 60', 60", 90, 95) are provided, each having a first axially extending portion extending along the first outer surface and having a sealing area outer surface defining a bellows seal seat (64, 98) and a radially extending portion extending along the end face. Each bellows seal (52, 54) is connected to the housing at one end and connected to said bellows seal seat (64, 98) at another end.

20 Claims, 4 Drawing Sheets

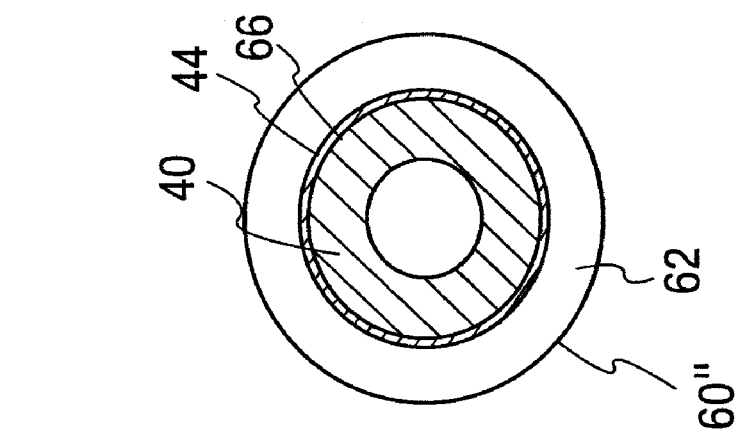
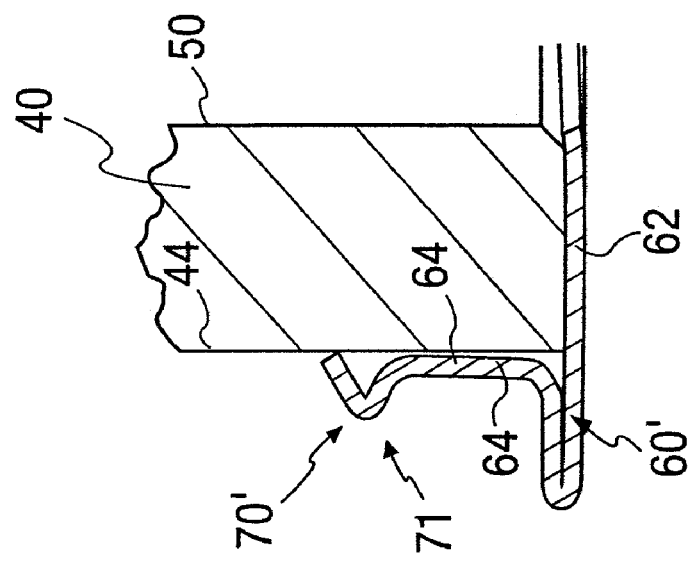
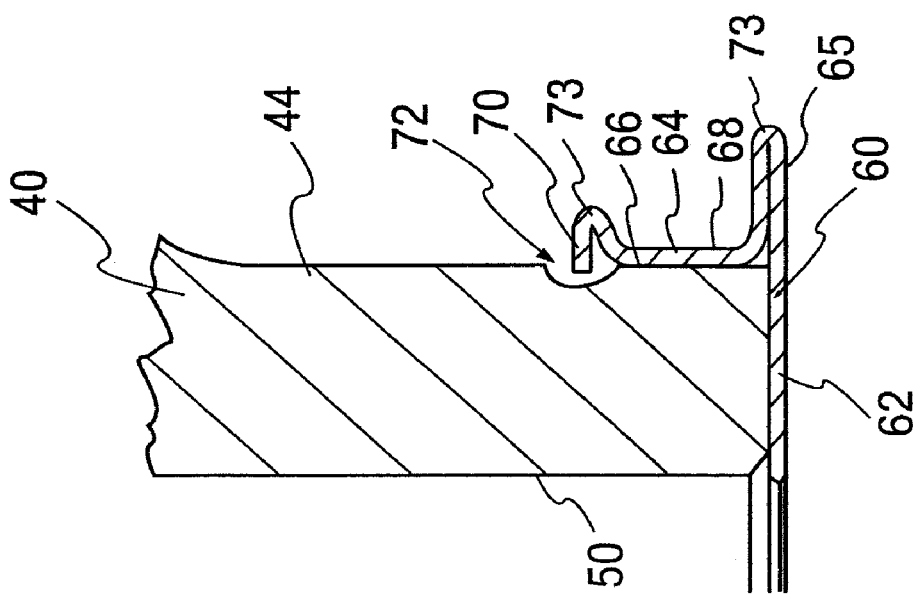

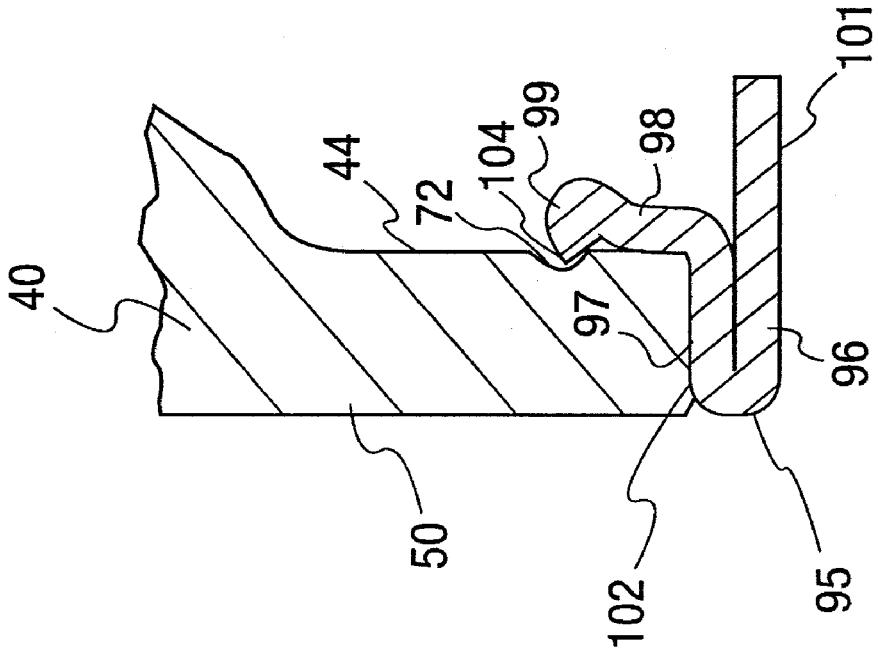
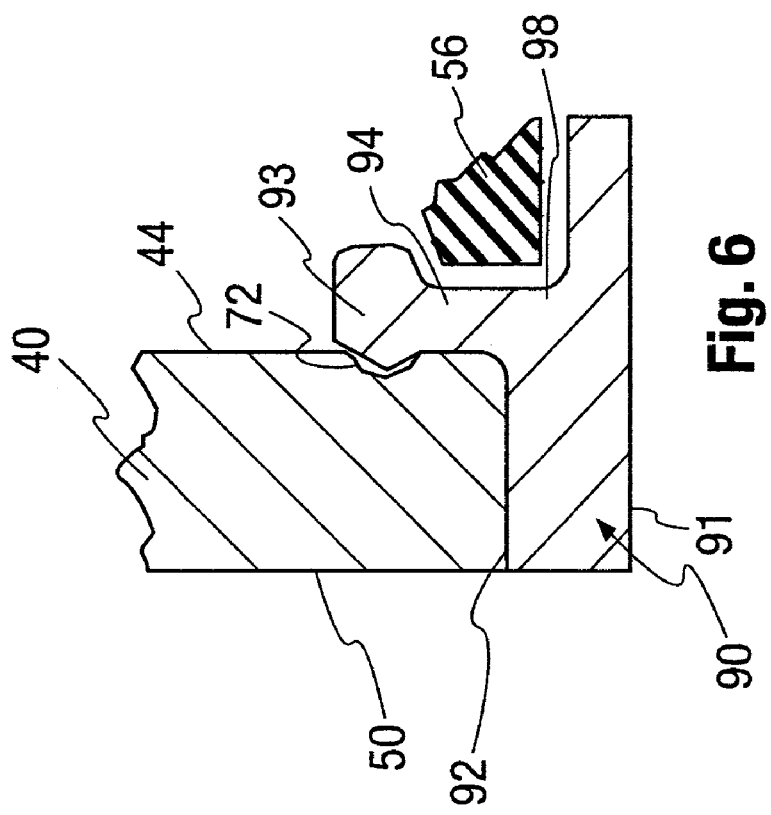

CROSS AXIS BALL AND SOCKET JOINT WITH SEALING RING FOR CROSS AXIS SLEEVE ENDS

FIELD OF THE INVENTION

The present invention relates to cross axis joints in general and more particularly to cross axis ball and socket joint constructions having a ball sleeve with a through hole and a central ball with pivot pin ends (sleeve ends) having a sealing area on the outer surface for connection with a bellows element (sealing boot).

BACKGROUND OF THE INVENTION

Cross axis joints are known that include a central ball joining two pivot pins (stud ends). Such ball-and-socket joints make possible a controlled movement of two adjacent components in relation to one another. The central ball joint is mounted in a bearing shell which is supported within a housing. The ball and pivot pin structure is hollow providing a ball sleeve for receiving a bolt.

A cross axis joint is a ball-joint especially designed to carry loads in a radial direction and transfer such loads to a mating part by clamping force and friction. Typically, a two-sided device (connection part frame with two flanges) is touching the respective surfaces of the inner sleeve. The devices (flanges) have a through hole and during the assembly process a bolt will be put through the device and the inner diameter or through hole of the cross axis joint. After that the bolt will be tightened up, so that the contact friction (between end face and connection piece) will keep the joint from moving. Typically the cross axis joint is used as a damper joint (housing is pressed in into the damper) or as a pivot joint as replacement for a bushing at the control arm subframe connections at the front suspension and in addition as a knuckle joint in the rear suspension. Washers and built up inner sleeves are known to be provided between the connection part and the sleeve end face, but they show the disadvantage that either the washers are pressed in, into the inner diameter and reduce therefore the crush load, or increase the outer diameter or the built up ones also reduce the crush load for a certain diameter. Currently it is difficult to seal cross-axis joints, this is primarily due to lack of sealing areas and "protection" of the mating part surface. Common current designs have ferrulls (washers) that are pressed into the inner bore of the sleeve. This requires the bore to be oversized (typically 2 mm larger than the bolt diameter) which determines the cross-axis opening requirement and sleeve thickness. There may be a quality concern that the washers could fall off during delivery to the customer.

US patent application publication 2004146338 (also DE10202022) discloses ball-and-socket joints including a cross axis type. One component is connected via a bolt accommodated within the hole of the ball sleeve to another component that is fastened on the outside of the joint housing. The bearing shell is fixed by two closing rings in the axial direction of the longitudinal axis of the pivot pin. For fixing the bearing shell, these closing rings have a cylindrical outer contour and an inner side to the outer contour of the bearing shell. The sealing boot connects to the housing at the outer contour of the closing ring. The outer surface of each pivot pin end has a sealing area with a contour for receiving a bellows element.

DE10362009 discloses a ball-and-socket joint for automobiles and aircraft undercarriages with a housing having a main section and ring parts. The housing has an internal section or ball sleeve with a bearing surface and a bearing shell in the housing main section. The outer surface of each pivot pin end of the ball sleeve has a sealing area with a contour for receiving a bellows element.

The shaping of an outer surface of each pivot pin end of the ball sleeve with a sealing area contour for receiving a bellows element has disadvantages. The shaping or framing of the pivot ends lowers the material properties and lowers the ability to withstand clamping forces. The bolt is otherwise sized so as to provide a clamping force (e.g. to generate friction between the bolt and surface and a part clamped to the ball sleeve) that is enough such that radial loads can be withstood without slipping. The ball sleeve must withstand clamping forces of the bolt without yielding or crushing. As such the amount of surface area of the ball sleeve end face needed in contact with the clamped part needs to become larger. As such, washers have been used to increase this area for clamping. Washers can be used at an end face of the ball sleeve and these may extend to the interior of the sleeve. These then limit the bolt size that can fit through the sleeve opening or the construction must be oversized.

SUMMARY OF THE INVENTION

It is an object of the invention to provide an improved ball and socket joint, particularly a cross axis joint that is free of the problems noted above and which is simple in design, rugged in construction and is economical to manufacture.

According to the invention, a ball joint is provided comprising a housing, a bearing shell in the housing and a ball sleeve. The ball sleeve includes a ball portion with a bearing surface cooperating with the bearing shell and a first pivot pin and a second pivot pin extending from the ball portion in an axial direction. The ball sleeve has an inner surface defining a through hole for receipt of a connection bolt. The first pivot pin has a first end with a first outer surface and a first annular end face. The second pivot pin has a second end with a second outer surface and a second annular end face. A first sealing ring is provided having a first axially extending portion extending along the first outer surface and having a sealing area outer surface defining a first bellows seal seat and a radially extending portion extending along the first end face. A second sealing ring is provided having a second axially extending portion extending along the second outer surface and having a sealing area outer surface defining a second bellows seal seat and a radially extending portion extending along the second end face. A first bellows seal is connected to the housing at one end and connected to the first bellows seal seat at a first bellows other end. A second bellows seal is connected to the housing at one end and connected to the second bellows seal seat at a second bellows other end.

A retaining means may be provided associated with each of the first sealing ring and the second sealing ring for retaining the first axially extending portion relative to the first outer surface and retaining the second axially extending portion relative to the second outer surface.

The retaining means may comprise a bent end of each axially extending portion having an edge engaged in the pivot pin outer surface. The retaining means may also comprise a radially protruding potion at an end of each the axially extending portion and a recess in each the outer surface to receive an associated protruding potion. Each outer surface of the axially extending portion may include the protruding potion to define the bellows seal seat.

Each the radially extending portion extending along the first end face may advantageously include a facing portion extending from the axially extending portion toward the through hole and facing the end face and a folded over portion extending from the facing portion radially away from the through hole to define a connected part contact surface. Each radially extending portion extending along the first end face may advantageously include a facing portion extending from the axially extending portion toward the through hole and facing the end face and a folded over portion extending from the facing portion radially away from the through hole to define a connected part contact surface.

The retaining means may comprise an interference fit between the axially extending portion and the pivot pin outer surface. This may be implemented by roughening a contact surface and/or by dimensioning the parts for interference fitting. Where the retaining means includes such a roughened surface between the axially extending portion and the pivot pin outer surface and/or the end face, good clamping/retention is achieved.

The invention provides improved sealing performance including an increase sealing area/protection as well as a possible use of "thick coatings (Everlube, Geomet). The sealing area is over one surface, not multiple surfaces. The ball sleeve can be straight or any easily produced shape so as to remove some of the complexity from the formation of the ball sleeve in order to compensate for the additional costs of the ring. The invention allows for the potential use of a ball sleeve raw part with minimum machining versus typical screw machine sleeve.

The sealing rings have the function of a washer (increased bearing area) at the interface of the pivot pin end face (sleeve end face) and the connected part. This sealing ring functioning as a washer is fixed onto assembly and it is not possible for it to fall off (the sealing boot or bellows seal locks it onto part).

A thick metal piece design may also act as a ferrull but without increasing the bore size and without the associated manufacturing and quality problems with the "interior" press-in (falling off, presence check).

The invention also presents the advantage that there is a potential for reduced coating costs of coating the entire stud (pivot pin) versus only covering the sealing rings or the cap part (caps are symmetrical so only one piece is coming into a production area). Further, it is possible to roughen an inner axially extending surface (and also the radially extending surface) of the sealing ring surface, thereby increasing the friction of the clamped connection (whereby it is possible to downsize the bolt and the joint). Such a cross axis or X-axis joint according to the invention is more robust than prior joints and can pass key-life testing based on the ring providing an amount of sealing surface for opportunity to add pre-seal lips.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a sectional view showing a first embodiment of a ball sleeve sealing ring according to the invention;

FIG. 4 is a sectional view showing a second embodiment of a ball sleeve sealing ring according to the invention;

FIG. 5 is a top view showing a third embodiment of a ball sleeve sealing ring according to the invention;

FIG. 6 is a sectional view showing a fourth embodiment of a ball sleeve sealing ring according to the invention; and FIG. 7 is a sectional view showing a fifth embodiment of a ball sleeve sealing ring according to the invention.

DESCRIPTION OF THE PREFERRED EMBODIMENTS

Figure 1:
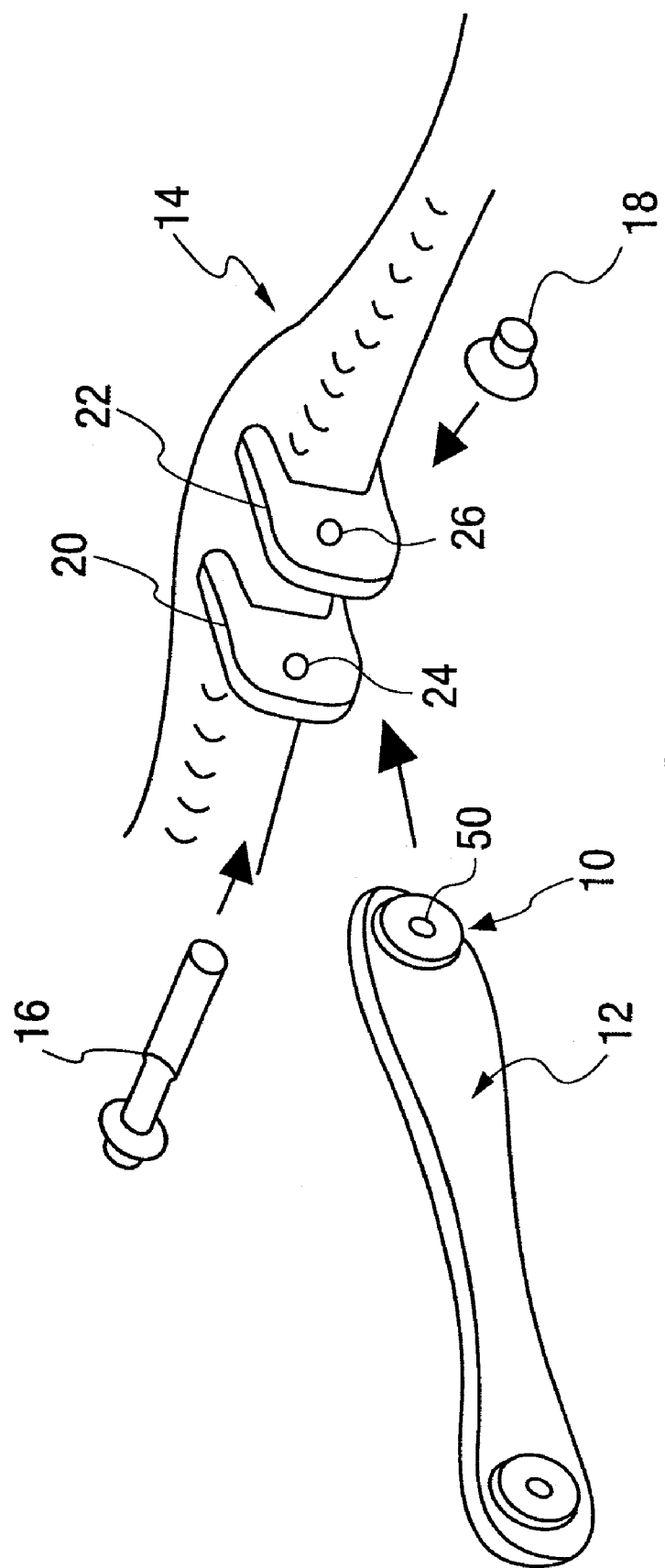
FIG. 1 is a schematic perspective view showing the ball joint according to the invention as well as the environment of the ball joint according to the invention.

Referring to the drawings in particular, the invention comprises a ball joint 10, particularly a cross axis joint designed to carry loads in a radial direction and to transfer the load between two mating parts. In the example shown in FIG. 1, the ball joint 10 has a main housing part 28 (FIG. 2) connected to an arm 12. Another part 14 is in the form of a two sided clevice, namely with a first flange 20 and second flange 22. The flanges have holes 24 and 26 to receive a bolt 16 with a nut 18. The bolt 16 passes through a through opening 50 of the ball joint 10.

Figure 2:
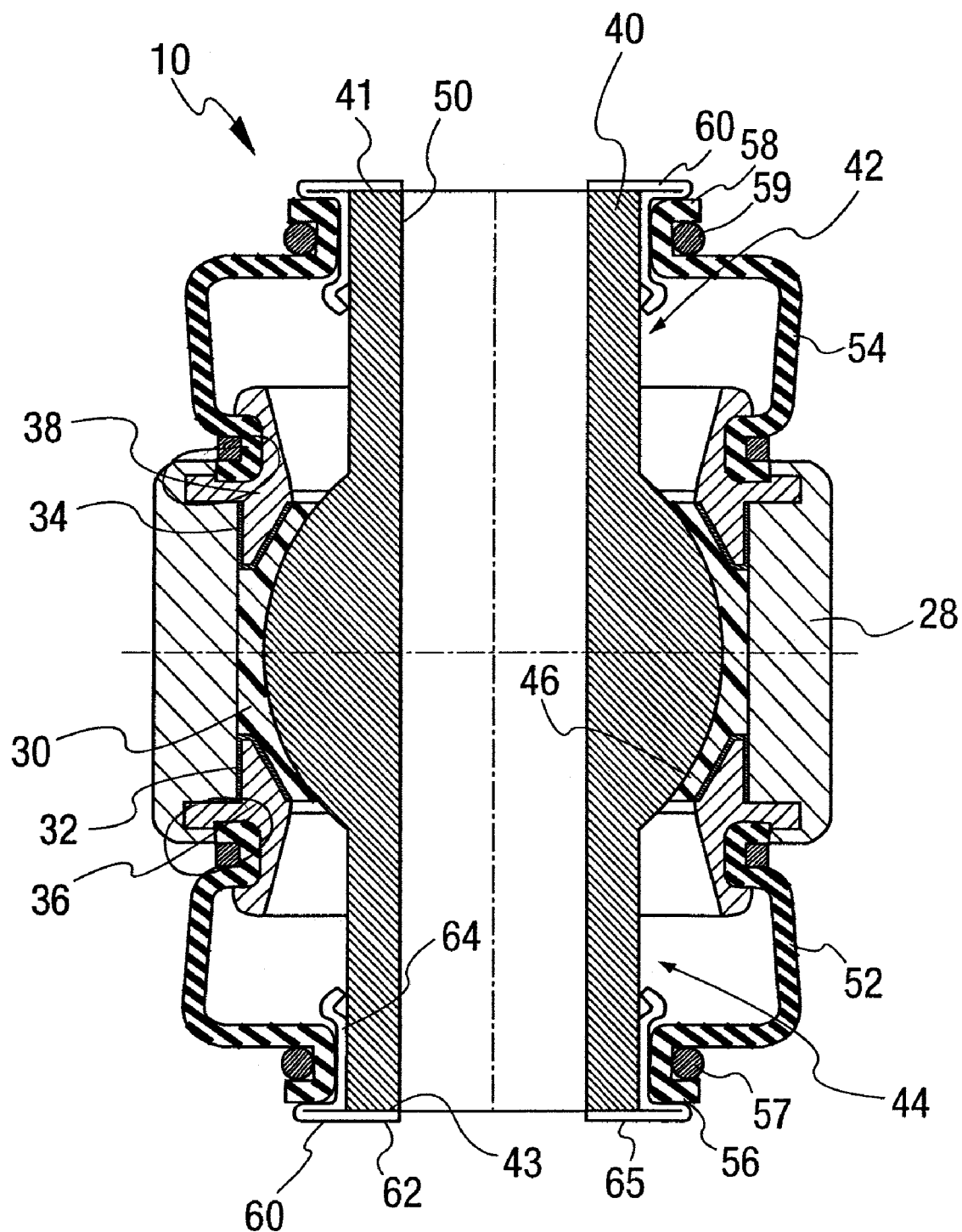
FIG. 2 is a cross-sectional view of the ball joint according to the invention including sleeve sealing rings.

FIG. 2 shows a first embodiment of the ball joint 10 according to the invention. A metallic housing 30 is provided supporting a bearing shell 30 in an inner space. The bearing shell 30 is held in place by a lower intermediate part 32 and lower housing ring 36 at one end and by an upper intermediate part 34 and upper housing ring 38. The rings 36 and 38 are held in position by a deformation of the ends of the material of the main housing part 28, to lock the rings 36 and 38 in position. Within the bearing shell 30 a ball sleeve 40 is provided, particularly with a ball sleeve bearing surface 46 in contact with the bearing shell 30. The ball sleeve 40 has the inner through opening 50 and has first and second (shown as upper and lower) pivot pins (also referred to as studs) with outer sleeve surfaces 42 and 44. The ball sleeve 40 also has a first end face 41 and a second end face 43. A sealing ring 60 is provided at each end of the ball sleeve 40. Each sealing ring 60 includes a radially extending part 62 extending along the end face (43 or 41 respectively) and an axially extending part 64 extending along the outer sleeve surface (42 or 44 respectively). Each sealing ring 60 provides a friction clamping surface 65 of the radially extending part 62, that will come in contact with the connection part (20 or 22). Each axially extending part 64 includes an inner surface 66 in contact with the sleeve outer surface (42 or 44). Each axially extending part 64 has an outer surface 66 which defines a sealing bellows seat. As shown, the housing rings 38 and 36 each define a sealing bellows seat to receive an end of a sealing bellows 54 or 52. Sealing bellows 52 has an end 56 seated in the seat 68 and held by clamping element 57. Sealing bellows 54 has an end 58 seated in the seat 68 of the respective sealing ring 60 and held by clamping element 59.

FIG. 3 shows an enlarged cut away sectional view of the sealing ring 60, according to the first embodiment of the invention. The sealing ring 60 is formed of a thin annular metal piece with a first bend 73 that forms the radially extending parts 62 with a fold over region above and below the bend 73. This provides the surface 65 as a contact surface with a larger surface area than the end face 43 (or 41) of the ball sleeve 40. As can be seen a FIG. 3 the axially extending part 64 provides the seat 68. The axially extending part 64 also has the upper that part 73 with an edge 70 that extends into a recess 72 at the outer sleeve surface 44 (or outer sleeve surface 42).

FIG. 4 shows a second embodiment that is a variation of the embodiment of FIG. 3. According to the second embodiment of the sealing ring 60' of FIG. 4, the radially extending part 62 and the axially extending part 64 are the same as shown in FIG. 3, except the axially extending part 64 has a bend 71 providing an edge portion 70' that engages the outer sleeve surface 44 (or outer sleeve surface 42) without the need for a groove on the outer sleeve surface 44 (or outer sleeve surface 42). The edge portion 70' engages the outer sleeve surface 44 (or outer sleeve surface 42) to hold the sealing ring 16 in place.

A third embodiment according to invention is provided with the structure as shown in FIG. 3 or 4 (or one of the other embodiments) but with a roughened inner surface at extending part 62 and/or the axially extending part 64. Additionally, or as an alternative, the facing surfaces (side 42, 44 and/or bottom 43, 41) of ball sleeve 40 may be roughened. FIG. 5 shows a sealing ring 60" with an axially extending part 64 with an inner surface 66 in contact with the outer surface 44. The radially extending part 62 and the axially extending part 64 do not need to have a bent part 73, 71 but this may also be provided otherwise as shown in FIGS. 3 and 4. The contact and the connection of axially extending part 64 to outer surface 44 is in the form of an interference fit. Further, good connection properties may be obtained in this regard wherein the surface 66 (or the outer surface of 44 or 42) are roughened to increase friction. This interference fit and/or roughened surface fit provides increased friction that can be used to hold the sealing ring 60" in place, particularly also with the force applied by the bellows seal ends 56 and 58 (sealing boot ends) in an assembled position.

FIG. 6 shows a cross-sectional view of a fourth embodied according to the invention. According to the fourth embodiment, a sealing ring 90 is provided in place of the sealing ring 60 shown in FIG. 2. The sealing ring 90 provides a sealing seat 98 for receiving the end 56 (or 58) of the bellows seal 52 (or 54). However the sealing ring 90 is provided as a thick piece of metal with machined surfaces with a surface 92 at the end face 43 (or 41) and a contact surface 91 that will be in contact with the connection part (20 or 22). The machined or otherwise provided surfaces also include a radially protruding part 93 with one side protruding into a groove 72 at the outer sleeve surface 44 (or 42) and another side protruding to form the seat 98. The sealing ring 90 may be pressed onto the end of the sleeve 40 allowing the radially protruding part 93 to engage the grooved 72 to lock the sealing ring 90 in place.

FIG. 7 shows in a cross sectional view a fifth embodiment according to the invention. A thick metal blank is provided which is folded at radially extending parts 96 and 97 to form the annular sealing ring 95. This provides an inner surface 102 in contact with the end face 43 (or end face 41) and an outer surface 101 that will be in contact with the connection part (20 or 22). Further, an axially extending part 98 extends toward the ball surface 46 from the radially extending part 97. The axially extending part 98 extends along the outer surface 44 to a bent region 99. The bent region 99 provides an edge 104 that is engaged in a groove 72 on the outer surface 44 (or outer surface 42). As such, the sealing ring 95 is retained relative to the ball sleeve 40. As with the other embodiments, the sealing ring 95 provides a bellows seal seat 98.

While specific embodiments of the invention have been shown and described in detail to illustrate the application of the principles of the invention, it will be understood that the invention may be embodied otherwise without departing from such principles.

What is claimed is:

1. A ball joint, comprising:
    a housing;
    a bearing shell in the housing;
    a ball sleeve including a ball portion with a bearing surface cooperating with the bearing shell and a first pivot pin and a second pivot pin extending from said ball portion in an axial direction, said ball sleeve having an inner surface defining a through hole for receipt of a connection bolt, said first pivot pin having a first end with a first outer surface and a first annular end face, said second pivot pin having a second end with a second outer surface and a second annular end face;
    a first sealing ring having a first axially extending portion extending along said first outer surface, said first sealing ring having a sealing area outer surface defining a first bellows seal seat and a first radially extending portion extending along said first end face, said first axially extending portion being integrally connected to said first radially extending portion to form a unitary undivided first sealing ring structure;
    a second sealing ring having a second axially extending portion extending along said second outer surface, said second sealing ring having a sealing area outer surface defining a second bellows seal seat and a second radially extending portion extending along said second end face, said second axially extending portion being integrally connected to said second radially extending portion to form a unitary undivided second sealing ring structure;
    a first bellows seal in contact with said housing at one end, said first bellows seal being in contact with said first bellows seal seat at a first bellows other end; and
    a second bellows seal in contact with said housing at one end, said second bellows seal being in contact with said second bellows seal seat at a second bellows other end.

2. A ball joint according to claim 1, further comprising retaining means associated with each of said first sealing ring and said second sealing ring for retaining said first axially extending portion relative to said first outer surface and retaining said second axially extending portion relative to said second outer surface.

3. A ball joint according to claim 1, wherein said retaining means comprises a bent end of each axially extending portion having an edge engaged in the pivot pin outer surface.

4. A ball joint according to claim 1, wherein said retaining means comprises a radially protruding portion at an end of each said axially extending portion and a recess in each said outer surface to receive an associated protruding potion.

5. A ball joint according to claim 4, wherein an outer surface of each said axially extending portion including said protruding portion defines said bellows seal seat.

6. A ball joint according to claim 1, wherein each said radially extending portion extending along said first end face includes a facing portion extending from said axially extending portion toward said through hole and facing said end face and a folded over portion extending from said facing portion radially away from said through hole to define a connected part contact surface.

7. A ball joint according to claim 1, wherein each said radially extending portion extending along each said end face includes a facing portion extending from said axially extending portion toward said through hole and facing said end face and a folded over portion extending from said facing portion radially away from said through hole to define a connected part contact surface, each sealing bellows seal being in contact with said folded over portion.

8. A ball joint according to claim 7, wherein each of said axially extending portions comprises a bent portion extending radially in a direction away from said through hole.

9. A ball joint according to claim 8, wherein each bellows seal seat is located between said bent portion and said folded portion.

10. A ball joint according to claim 1, wherein said retaining means comprises an interference fit between said axially extending portion and said pivot pin outer surface.

11. A ball joint according to claim 1, wherein said retaining means comprises a roughened surface between said axially extending portion and said pivot pin outer surface.

12. A ball joint according to claim 1, wherein each sealing ring comprises two projections extending radially in a direction away from said through hole, wherein the bellows seal seat of each sealing ring is located between the two projections.

13. A ball joint according to claim 12, wherein said first bellows seal extends continuously from said first bellows seal seat to said housing such that a portion of said first bellows seal is located at a spaced location from said first pivot pin, said second bellows seal extending continuously from said second bellows seat to said housing such that a portion of said second bellows seal is located at a spaced location from said second pivot pin.

14. A ball joint comprising:
a housing;
a bearing shell located in the housing;
a ball sleeve including a ball portion with a bearing surface and a first pivot pin portion and a second pivot pin portion, said bearing surface engaging said bearing shell, said first pivot pin portion and said second pivot pin portion extending from said ball portion in an axial direction, said ball sleeve having an inner surface defining a through hole for receiving a connection bolt, said first pivot pin portion having a first end with a first outer surface and a first annular end face, said second pivot pin portion having a second end with a second outer surface and a second annular end face;
a first sealing ring having a first folded portion, a first axially extending portion extending along said first outer surface and a first radially extending portion extending along said first end face, said first folded portion being integrally connected with said first axially extending portion and said first radially extending portion, said first folded portion and said first axially extending portion defining a first bellows seal seat;
a second sealing ring having a second folded portion, a second axially extending portion extending along said second outer surface and a second radially extending portion extending along said second end face, said second folded portion being integrally connected with said second axially extending portion and said second radially extending portion, said second folded portion and said second axially extending portion defining a second bellows seal seat;
a first bellows seal, said first bellows seal engaging said housing at one end, said first bellows seal being in contact with said first bellows seal seat at a first bellows other end such that said first bellows seal engages said first folded portion and said first axially extending portion; and
a second bellows seal, said second bellows seal engaging said housing at one end, said second bellows seal being in contact with said second bellows seal seat at a second bellows other end such that said second bellows seal engages said second folded portion and said second axially extending portion.

15. A ball joint according to claim 14, further comprising retaining means associated with each of said first sealing ring and said second sealing ring for retaining said first axially extending portion relative to said first outer surface and retaining said second axially extending portion relative to said second outer surface.

16. A ball joint according to claim 14, wherein said retaining means comprises a bent end of each axially extending portion having an edge engaged in the pivot pin outer surface, each said bent end of said axially extending portions defining a portion of each said seal bellows seat.

17. A ball joint comprising:
a housing;
a bearing shell arranged in the housing;
a ball sleeve including a ball portion with a bearing surface and a first pivot pin and a second pivot pin, said bearing surface being in contact with said bearing shell, said first pivot pin and said second pivot pin extending from said ball portion in an axial direction, said ball sleeve having an inner surface defining a through hole for receiving a connection bolt, said first pivot pin having a first end with a first outer surface and a first annular end face, said second pivot pin having a second end with a second outer surface and a second annular end face;
a first sealing ring having a first bent end portion, a first folded portion, a first axially extending portion extending along said first outer surface and a first radially extending portion extending along said first end face, said first folded portion being integrally connected with said first axially extending portion and said first radially extending portion, said first bent end portion being integrally connected with said first axially extending portion, said first bent end portion engaging said first outer surface of said first pivot pin, wherein said first bent end portion, said first folded portion and said first axially extending portion define a first bellows seal seat;
a second sealing ring having a second bent end portion, a second folded portion, a second axially extending portion extending along said second outer surface and a second radially extending portion extending along said second end face, said second folded portion being integrally connected with said second axially extending portion and said second radially extending portion, said second bent end portion being integrally connected with said second axially extending portion, said second bent end portion engaging said outer surface of said second pivot pin, wherein said second bent end portion, said second folded portion and said second axially extending portion define a second bellows seal seat;
a first bellows seal, said first bellows seal engaging said housing at one end, said first bellows seal engaging said first bellows seal seat at a first bellows other end such that said first bellows seal is in contact with said first axially extending portion and said first folded portion, whereby said first bellows seal is located between said first bent end portion and said first folded portion at said first bellows other end; and
a second bellows seal, said second bellows seal engaging said housing at one end, said second bellows seal engaging said second bellows seal seat at a second bellows other end such that said second bellows seal is in contact with said second axially extending portion and said second folded portion, whereby said second bellows seal is located between said second bent end portion and said second folded portion at said second bellows other end.

18. A ball joint according to claim 17, wherein said first folded portion extends radially from said first radially extending portion such that said first folded portion is located at a position outside of said through hole.

19. A ball joint according to claim 18, wherein said second folded portion extends radially from said second radially extending portion such that said second folded portion is located at a position outside of said through hole.

20. A ball joint according to claim 19, wherein said first bellows seal extends continuously from said first bellows seal seat to said housing such that a portion of said first bellows seal is located at a spaced location from said first pivot pin, said second bellows seal extending continuously from said second bellows seat to said housing such that a portion of said second bellows seal is located at a spaced location from said second pivot pin.

* * * * *